July 2, 1963  C. B. BAVER  3,095,699
COMBINED GAS-STEAM TURBINE POWER PLANT AND
METHOD OF OPERATING THE SAME Filed Dec. 18, 1958  2 Sheets-Sheet 1

INVENTOR.
Clyde B. Baver
BY
ATTORNEY

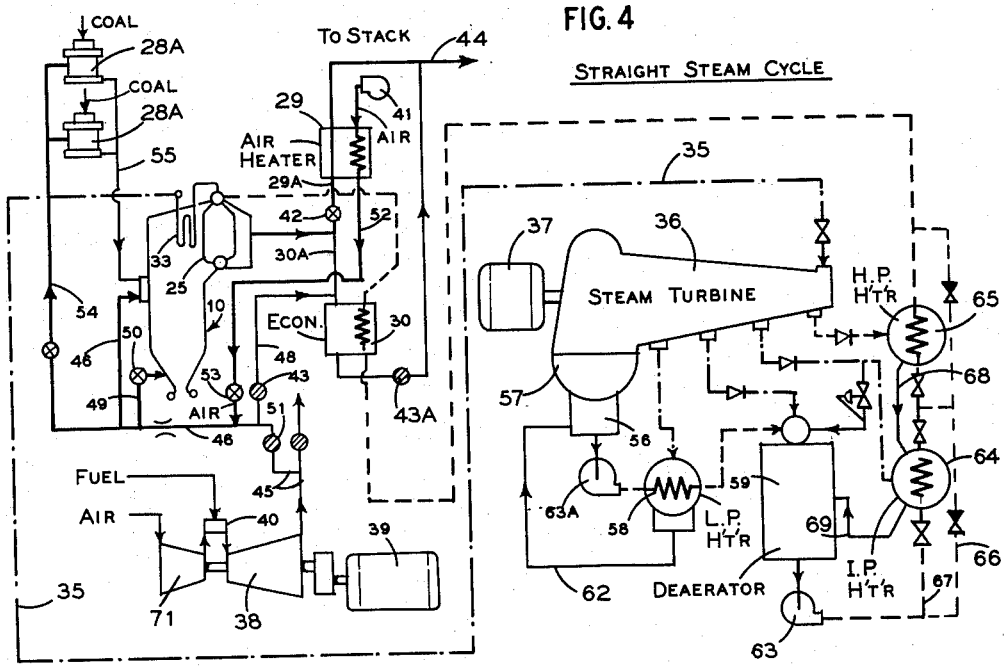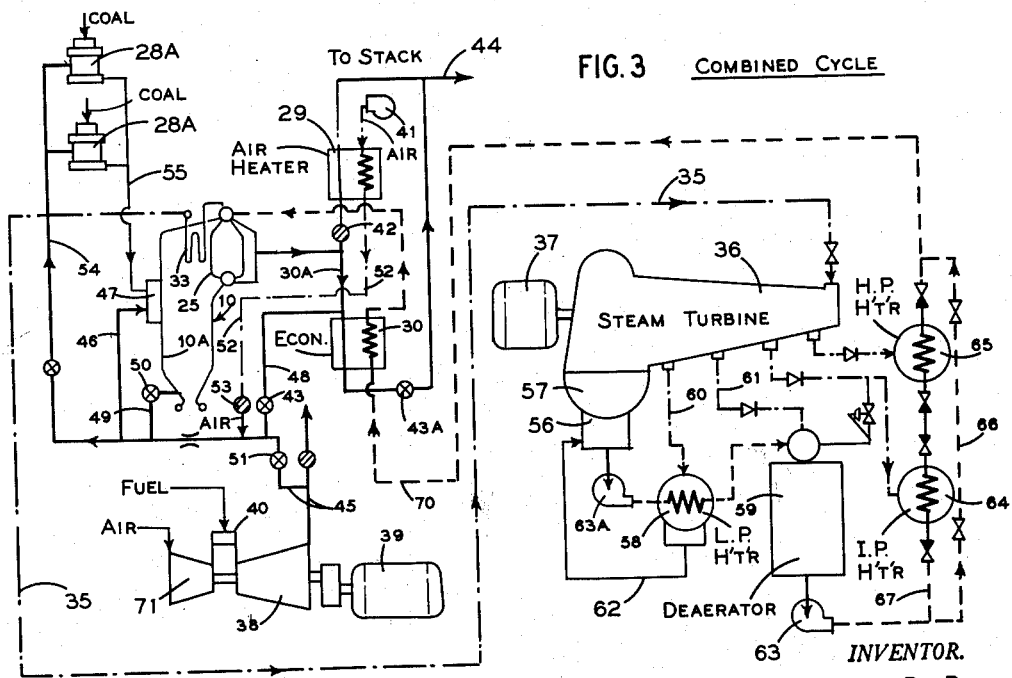

United States Patent Office 3,095,699
Patented July 2, 1963

3,095,699
COMBINED GAS-STEAM TURBINE POWER PLANT AND METHOD OF OPERATING THE SAME
Clyde B. Baver, Akron, Ohio, assignor to The Babcock & Wilcox Company, New York, N.Y., a corporation of New Jersey
Filed Dec. 18, 1958, Ser. No. 781,289
9 Claims. (Cl. 60—39.02)

This invention relates generally to power plants and more specifically to a power plant utilizing a steam generator in combination with a steam turbine and a gas turbine for either straight steam cycle operation or combined gas-steam cycle operation and an improved method of operating the same.

In the operation of a gas turbine, the combustion of fuel for producing the motive fluid used in driving the gas turbine takes place in the presence of a comparatively high percentage of excess air, with the result that the turbine exhaust gases may contain approximately 17% oxygen; which is enough to make them suitable for further use as a source for combustion air. In addition the exhaust gases are at a relatively high temperature, i.e. approximately 840° F., and thereby contain a considerable quantity of sensible heat which can be recovered and efficiently utilized.

Heretofore, the recoverable portion of the sensible heat in the exhaust gas of a gas turbine was used to generate steam principally by the straight convection process in a waste heat boiler, producing steam of a total temperature limited to about 750° F. However, according to this invention, rather than to use a waste heat boiler in conjunction with a steam generator in a combined gas-steam turbine operation to obtain a higher degree of superheat and at the same time improve the overall cycle efficiency, it is here proposed to utilize a portion of the hot exhaust gases of the gas turbine as preheated combustion air for fuel burned in a separately fired steam generator, thereby recovering the sensible heat in the exhaust gases. At the same time the usual steam generator dry gas loss which results from heating air for combustion from room temperature to boiler exit temperature are eliminated, with a consequent significant reduction in the fuel requirements of the steam generator. In addition, another portion of the turbine exhaust gases is introduced into the furnace to effect control of final superheat steam temperature over a relatively wide load range, while another portion and/or the remainder of the exhaust turbine gases is introduced into the economizer flue inlet where it commingles with the main body of flue gases leaving the boiler and passes in heat exchange relationship to the feed water supplying the steam generator. In the event the steam generator is fired by pulverized fuel, another portion of the exhaust turbine gases, tempered by room temperature air, is utilized for fuel drying and transport of the fuel in the pulverizer; and then becomes the primary combustion air for the burners of the steam generator.

It is an object of this invention to effectively utilize the heat of a gas turbine exhaust to increase the thermal efficiency of a separately fired steam generator operating in conjunction therewith.

Another object is to operate a separately fired steam generator in combination with a steam turbine and a gas turbine either in a straight steam cycle or in a combined gas-steam cycle wherein the steam generator may be switched from one cycle of operation to the other without removing it from service.

Another object is to provide an improved, reliable, economic and efficient power plant cycle.

A feature of this invention resides in the utilization of a portion of the gas turbine exhaust gases for reducing furnace absorption, thereby effecting control of final superheat temperature over a relatively wide load range during combined gas-steam cycle operation.

Another feature of this invention resides in the provision of a power boiler or steam generator unit having an air heater and an economizer connected in parallel and arranged to be selectively connected in heat transfer relationship with respect to the combustion gases flowing through the unit so that the air heater is rendered operative only during straight steam turbine cycle operation and the economizer rendered operative only during combined gas-steam turbine cycle operation.

Other features and advantages will be apparent when considered in view of the drawing and specification in which:

FIG. 3 is a schematic diagram illustrating the fluid flow paths during combined gas-steam turbine cycle of operation.

FIG. 4 is a schematic diagram illustrating the fluid flow paths during straight steam cycle operation.

Figure 2:
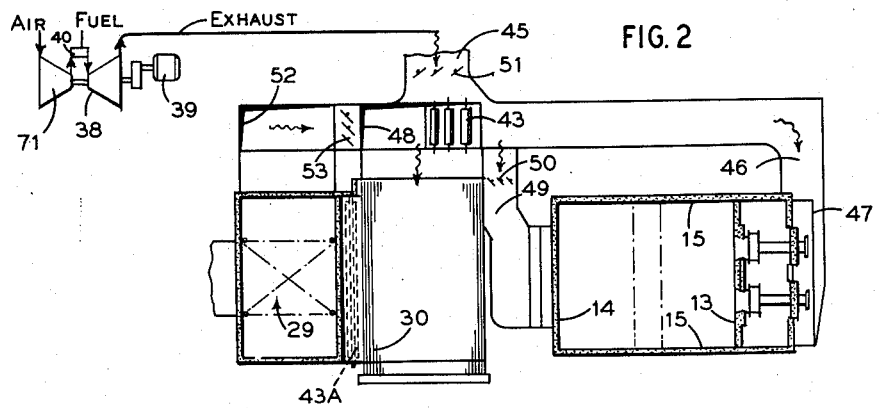
FIG. 2 is a plan sectional view taken along line 2—2 of FIG. 1.
Figure 1:
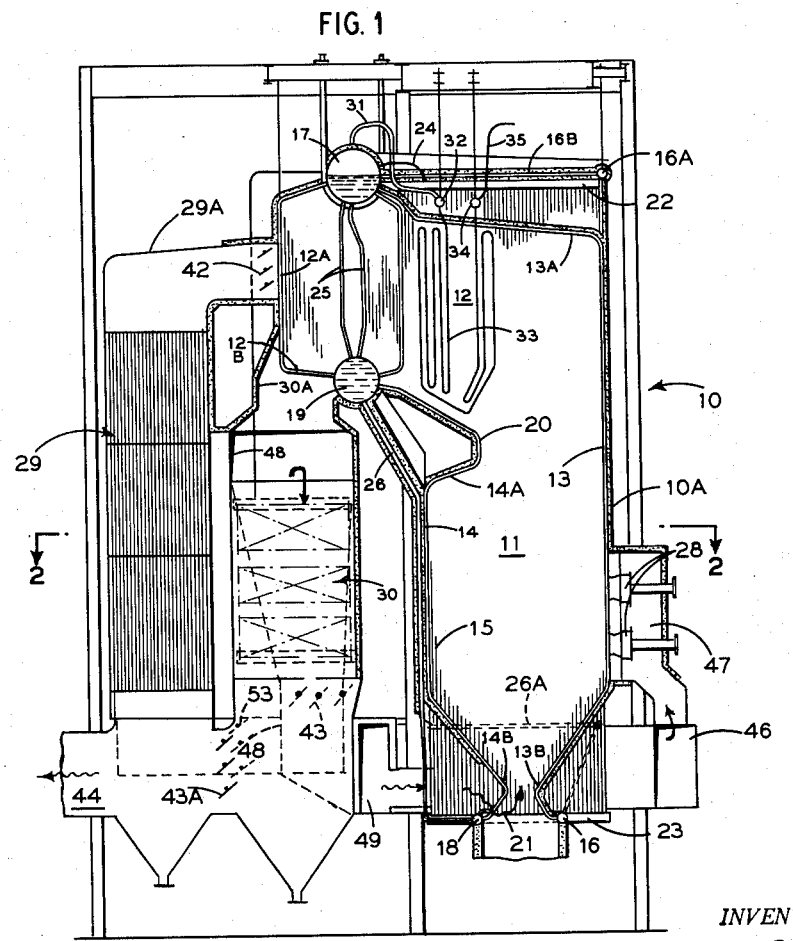
FIG. 1 is a vertical sectional view of a steam generator which in accordance with this invention is arranged so that it can be switched from either steam cycle operation to combined gas-steam turbine cycle operation and vice versa.

In accordance with this invention, the illustrated embodiment of the steam generating and heating unit 10 FIGS. 1 and 2, intended for central station use, is arranged to satisfy either straight steam turbine cycle operation or combined gas-steam turbine operation, in the latter instance utilizing 355,000 lbs. of 840° F. exhaust gases per hour from a gas turbine to increase the thermal efficiency of the steam generating unit. The steam generator unit 10 has a steam generating capacity of 130,000 lbs. of steam per hour at 625 p.s.i.g. and 825° F. final steam temperature when firing pulverized coal, natural gas or oil alone, or in combination with the gas turbine exhaust.

The steam generating and heating unit 10 comprises essentially a setting 10A defining a top supported upright elongated furnace chamber 11 opening to a laterally extending convection gas pass 12. The furnace chamber 11 is bounded by rectangularly disposed front, rear and side walls of steam generating tubes 13, 14 and 15 respectively. A portion of the front wall tubes 13, extending upwardly from a lower supply header 16, are routed inwardly at the top of the furnace chamber 11 as roof tubes 13A and connect into a steam and water separating drum 17. The remainder of tubes 13 enter the upper front wall header 16A, with suitable circulator tubes 16B connecting the upper header to drum 17. Generating tubes 14 in the rear wall extend upwardly from a lower header 18 and connect into a water drum 19, disposed at the bottom of the gas pass 12 and below the steam separating drum 17. As shown, an upper portion 14A of the rear wall tubes is bent to define a nose arch 20. The lower portions 13B and 14B of the front and rear tubes 13 and 14, respectively, are inwardly and outwardly bent to define a hopper furnace bottom terminating in an ash opening 21. Generating tubes 15 of the side walls extend vertically between respective upper and lower headers 22 and 23 with suitable conduits 24 connecting the respective upper sidewall headers 22 into fluid circulation with the steam drum 17.

Generating tubes banks 25, disposed in the gas pass 12, interconnect the upper drum 17 with the lower water drum 19. In operation, natural circulation between drums 17 and 19 is established by a portion of the rear generating tube bank 25 serving as downcomers to supply the furnace walls via the lower drum 19, and the forwardly disposed portion of tubes 25 which are located upstream gas-flow wise in a relatively hotter gas zone serving as risers. Downcomer pipes 26 and 26A supply the lower front and rear wall headers, respectively, from the water drum 19. Suitable conduits, not shown, connect headers 16 and 18 to the side wall headers 23 and the lower headers 16, 18 and 23 in turn supply the connected wall tube circuits.

A plurality of burners 28, adapted to fire either gas, oil or pulverized coal, are disposed adjacent the bottom of the furnace and are arranged to discharge hot products of combustion through burner ports in the front wall. In the illustrated arrangement, pulverized coal is supplied to the burners from pulverizers 28A connected in parallel, as shown in FIGS. 3 and 4. Preferably the pulverizers 28A are sized so that only one is in the use when the gas turbine is in operation. When the gas turbine is not operating both pulverizers are required for full load operation of the steam generator. The combustion gases generated in the furnace chamber flow vertically upward through the furnace 11 and thence laterally into the convection gas pass 12, the gases exiting from the gas pass 12 through suitable outlets 12A, and 12B opening to an air heater 29 and economizer 30, respectively, and which in accordance with this invention are connected in parallel as will be hereinafter described.

As the combustion gases flow upwardly through the furnace, the front, rear and side wall tubes 13, 14 and 15 absorb heat mainly by direct radiation and convert the mixture rising in tubes 13 and 15 discharging into the steam drum, while the mixture in tubes 14 discharges into drum 19 to supplement the flow in tube bank 25. The tube bank 25 disposed in the gas pass in turn absorbs head by convection, converting the water rising therein also into a steam-water mixture. The resulting steam-water mixtures are then ultimately discharged into the steam and waterdrum 17 for separation.

The steam separated in the steam drum 17 is supplied by steam pipes 31 to an inlet header 32 of a suitable superheater 33 disposed in the gas pass 12 ahead of tube bank 25 wherein the steam is superheated to the desired temperature, and upon discharge from header 34 the steam enters pipe 35 for delivery to steam turbine 36 and associated generator 37.

The steam turbine 36 of the illustrated steam cycle has a maximum rating of 12,500 kw., at 3600 r.p.m., and is straight condensing, designed for 130,000 lbs. steam-heat at 625 p.s.i.g., 825° F. total steam temperature and 2 in. Hg abs. back pressure. Full load steam rate at the throttle is 8.93 lb. per kw.-hr. during combined gas-steam turbine operation. The generator 37 is rated at 12,500 kva.

In order to increase the electrical generating capacity of a power plant utilizing the steam generator 10 and associated turbine-generator herein described, a gas turbine 38, driving its own electric generator 39, is arranged to operate in parallel therewith. A gas turbine 38 suitable for use in conjunction with the above described steam power plant as shown schematically in FIGS. 1, 3 and 4 is a simple cycle, single shaft unit designed for burning natural gas fuel in the turbine combustor 40. The gas turbine is rated at 5,000 kw. at 6900 r.p.m. and 80° F. inlet temperature at air compressor 71 and 14.17 p.s.i.a. compressor inlet and turbine discharge pressure. The electrical generator 39 driven by the gas turbine is rated at 6250 kva. The drive for the gas turbine generator is a high speed, high precision double helical single reduction gear 6900 r.p.m./3600 r.p.m.

In a power plant wherein a steam turbine 36 and a gas turbine 38 are utilized in conjunction with one another to generate the total electrical output of a central power station it has been discovered that a gain in cycle efficiency can be realized at low loads if the gas turbine is operated at full load at all times, with any changes in the overall output of the combined gas-steam cycle being accounted for by varying the load on the steam generator. In accordance with this invention increased thermal efficiency of the steam generator 10 during combined steam-gas turbine cycle operation is attained by effectively recovering a portion of the sensible heat in the hot exhaust gases of the gas turbine 38. As gas turbine exhaust is rich in oxygen, approximately 17% as compared to 21% for free air, it can be used to supply the necessary air to support combustion and can therefore be utilized as preheated combustion air for burning the fuel required by the steam generator. Operating a separately fired steam generator and utilizing turbine exhaust gases for combustion air enables selections of boiler steam pressures and temperatures higher than considered practical with just a straight, waste heat recovery type of boiler supplied with exhaust gas at 840° F. Since the turbine exhaust gases contain more oxygen than is required for combustion of the auxiliary fuel in the boiler, some of the gases can be used for other purposes. According to this invention, when pulverized coal is burned as a fuel, a portion, tempered with room air, is used for drying the coal in the pulverizer 28A and then as primary air transporting the coal to the burners. A portion of the exhaust gases is also introduced into the furnace 11 through the hopper bottom for maintaining substantially constant final superheat steam temperature at loads down to 90,000 lbs. of steam per hour. Maintenance of superheat steam temperatures at low load is thus attained when it is realized that the amount of heat radiated by a flow stream of high temperature gases is not only a function of its temperature, but also of the area of the radiating source. With the introduction of the hot exhaust turbine gases into the furnace 11, in accordance with this invention, the newly generated combustion gases are crowded by the exhaust turbine gases into a smaller, cross-section, flow area, perimeter over a major portion of the gas flow path in the furnace. Thus, a shorter time of travel of the high temperature gases between the burners and the furnace gas outlet results due to the increased gas velocity and some decrease in the average length of gas travel in the furnace, but with no decrease in burner efficiency because of the lack of substantial mixing of the exhaust gases and newly generated combustion gases, until combustion has been virtually completed. The interposition of a stratum of the relatively low temperature tempering exhaust gases between the main combustion zone and a large area of the furnace wall tubes, coupled with a substantial decrease in the radiating perimeter of the main combustion zone, results in a considerable increase in the average temperature of the gases leaving the furnace over that of furnace exit gas temperature at the same operating loads without the introduction of exhaust gases. By the introduction of the exhaust gases to the furnace bottom, the superheater tubes are contacted by a greater mass flow of gases and at a higher temperature than would be the case if the exhaust gases were not present, thus a substantially higher superheat steam temperature is attained thereby.

That portion of the exhaust gases not required as preheated air for combustion or for maintaining superheat control is directed to the economizer in heat transfer relationship to the economizer surfaces wherein further heat is recovered before it passes to the stack. According to this invention, this portion of the turbine gases is mixed with the combustion gases prior to their flowing over the economizer surfaces.

If desired the steam generator in the combined gas-steam turbine cycle may be operated in a manner such that the quantity of exhaust gases introduced into the furnace chamber is maintained substantially constant and the superheat temperature maintained by regulating the firing rate of the burners.

When the gas turbine 38 is idle, the tubular air heater 29 is rendered operative and the economizer inoperative by actuation of appropriate dampers. Thus, for straight steam cycle operation the air heater provides the hot air to support combustion in the furnace and for drying and transporting of the coal when coal is being fired. Under these conditions a forced draft fan 41 is required to supply the air via the air heater. Also, with this mode of operation, four stages of feed heating are provided to improve the efficiency.

In accordance with this invention the steam generating unit 10 and the gas turbine 38 are connected by a duct system, the arrangement of which allows the steam generating unit 10 to operate either in a straight steam cycle, or in a combined gas-steam turbine cycle wherein the heat of the turbine exhaust gases is effectively recovered without requiring the steam generator to be removed from service to make the changeover.

As shown in FIGS. 1 and 2, and schematically in FIGS. 3 and 4 the tubular air heater 29 and the economizer 30 are connected in parallel to the gas pass 12 by suitable flues 29A, 30A respectively. To facilitate a change in the operating cycle, a damper 42 is disposed in the flue 29A at the gas inlet end of air heater 29 and dampers 43 and 43A are disposed in the gas inlet and gas outlet ends of the economizer 30, respectively. Dampers 42 and 43A control the flow of heating combustion gases from the gas pass 12 to the respective gas passes of the air heater 29 and the economizer 30. Damper 43 controls the flow of gas turbine exhaust to the economizer. The operation of the dampers 42, 43 and 43A is such that during straight steam cycle operation damper 42 is open and dampers 43 and 43A are closed as shown schematically in FIG. 4 whence during combined gas-steam turbine operation, the positions of dampers 42, 43 and 43A are the reverse as shown in FIG. 3. As shown, the air heater and economizer gas outlets connect into a flue 44 which discharges into the stack.

The flue 45 receiving the exhaust from the gas turbine 38 connects with branch flues 46, 48 and 49. Branch 46 directs a portion of the exhaust gases to the windbox 47 for use as secondary combustion air. Branch 48 directs another portion of the exhaust gases to the gas inlet end of the economizer gas pass and is there combined with the combustion gases leaving the gas pass 12 before flowing in heat exchange relationship to the economizer tubes. Branch 49 introduces another portion of the gases into the bottom of the furnace to control superheat temperatures as herein described. As seen in FIG. 2, and schematically illustrated in FIGS. 3 and 4, a damper means 50 is disposed in branch 49 to control the amount of exhaust gases introduced in the furnace bottom. Also the flue 45 leading from the turbine 38 is provided with a damper means 51 to seal off flue 45 when the gas turbine is not operating. A duct 52 communicating with the hot air outlet of the air heater 29 connects with branch 46 and a damper 53 is disposed at the junction of conduits 52 and 46. Accordingly, for straight steam cycle operation damper 53 is maintained open so that air heated in air heater 29 is supplied to the windbox 47 by flowing through duct 46. During combined cycle operation damper 53 is closed to seal duct 52 off from flue 45 and the combustion air, supplied by the gas turbine exhaust is delivered to the windbox through conduit 46.

In the event pulverized coal is fired in the furnace, a portion of the exhaust gases, during combined cycle operation, is bled from conduit 46 and delivered by conduit 54 for drying and transporting the fuel through coal pipes 55 to the burners. See FIGS. 3 and 4. In straight steam cycle operation the air for drying and transporting the fuel is supplied by the air heater 29, using the same conduits as used during the combined cycle operation.

Referring to the drawings and in particular to the schematic flow diagram of FIG. 3, the operation of the system described during the combined gas-steam cycle of operation is as follows:

In the flow diagram of FIG. 3, the gas flow cycle is illustrated by solid lines, the steam flow cycle by a dot-dash line and the feed water heating flow cycle signified by the broken line. With the gas turbine operating at maximum efficiency at full load, the air heater 29 is isolated from the gas cycle by closing dampers 42 and 53; thus allowing the heating gases leaving the convection gas pass 12 to flow through the gas pass 30B of the economizer 30 in heat transfer relationship to the feed water flowing therethrough in line 70. Heat from the exhaust gases of the turbine 38 is recovered by directing a portion thereof through ducts 45 and 46 to the windbox 47 for use as combustion air. When pulverized fuel is burned, a portion of the exhaust gases is bled from duct 46 through lines 54 and when tempered with room air is used for drying the fuel in the pulverizer 28A and as the fuel transport medium. Another portion of the exhaust gases is directed to the economizer through ducts 45 and 48 and combines with the heating gases flowing through duct 30A from the generator. With the combined gases flowing in heat transfer relationship to economizer surface additional heat is recovered therefrom. Another portion of the exhaust gases is introduced into the furnace through duct 49 to control final superheat temperature down to loads of 90,000 lbs. of steam per hour as hereinbefore described. Thus it is to be noted that the otherwise high turbine exhaust stack loss is greatly reduced.

Steam generated in the boiler is supplied through a suitable steam line 35 to the steam turbine 36 as the motive fluid for driving an electric generator 37.

The feed water heating cycle of the system, illustrated by the broken line, is designed to operate with four stages of regenerative feed water heating, but during the combined gas-steam turbine cycle of operation the condensed steam from the hot well 56 of the main surface condenser 57 is circulated by pumps 63A through the inner and after condenser of a steam-jet air-removal ejector (not shown), thence through a low pressure horizontal closed feed water heater 58 and then to an aerator type open heater 59 with bleeds from the fourth and third stages of the steam turbine supplying the heating medium for heaters 58 and 59, respectively. Drainage of the low pressure heater 58 will automatically return through line 62 to the surface condenser 56 after being cooled in the drain cooler section of the low pressure heater. Boiler pump 63, obtaining suction from the deaerating heater 59, reserve water storage, circulates the slightly heated condensate directly to the economizer. In so doing the condensate is by-passed around the two high pressure closed feed water heaters 64 and 65 by flowing through line 66.

Since the portion of the exhaust gases is introduced ahead of the economizer 30 and combines with the combustion heating gases leaving the generator, the feed water flowing through the economizer absorbs additional heat therefrom to increase the boiler cycle efficiency by approximately 6%.

In the straight steam cycle operation as illustrated by the flow diagram of FIG. 4, with the gas turbine idle, the economizer is isolated from the gas turbine portion of the cycle by closing dampers 43 and 43A. Thus, by opening dampers 42 and 53, the heating gases flowing from the gas pass 12 are forced to flow in heat exchange relationship with air circulated through the air heater as by means of a forced draft fan 41 and the gases then discharging therefrom are directed to the stack by duct 44. A portion of the air heated enters the windbox to be used as secondary air to support combustion and another portion of it is used for fuel drying and transport. If desired a portion of the air may be recirculated to the furnace for superheat control.

Steam generated in the boiler is directed by a suitable steam line 35 to the high pressure stage of the steam turbine 36 for driving the electric generator connected thereto.

Feed water heating during the straight steam cycle is attained by a pump circulating condensed steam from the condenser hot well 57 through inter and after condensers of steam-jet, air removal ejectors (not shown), then through the low pressure feed water heater 58 and then to the deaerator 59. A boiler feed pump 63 obtaining suction from the deaerator heater circulates the feed water through lines 67 successively through intermediate and high pressure feed water heaters 64, 65 respectively. From the high pressure heater 65 the feed water passes through the economizer 30. Since the economizer 30 is not receiving any heating gases from the steam generating unit 10, no heat recovery is performed in the economizer, during this cycle operation the feed water merely flowing therethrough to the boiler. Drains from the high pressure heater 65 automatically cascade to the intermediate high pressure heater 64 through line 68 and the combined drains from heaters 64 and 65 flow back to the deaerator through lines 69. Drains from the low pressure heater will return to the condenser by line 62 as hereinbefore described.

Make up for both operating cycles will be supplied from the mineralizing treatment plant (not shown). Station drips and drains will also supply a percentage of the make-up water and the entire system will be under automatic control.

From the foregoing it will be noted that the arrangement herein described is operative either as a straight steam cycle or as a combined gas-steam turbine cycle. If desired the system herein described may also be utilized to supplement a total output of a hydro-electric plant. When used in conjunction with a hydro-electric plant the combined gas-steam turbine system is designed to handle peak load conditions together with base load requirements. Thus the combined gas-steam turbine system when so designed and used in conjunction with a hydro-electric plant is rendered particularly useful during low water periods when the hydro-electric system is rendered inoperative.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:

1. A binary power plant comprising a steam generating and heating unit, a gas turbine supplying its exhaust gases to said heating unit to recover the sensible heat from said exhaust gases, a steam turbine arranged to receive the steam output of said units, and said steam generating and heating unit being connected to each of said turbines for either steam cycle operation only or for combined gas-steam cycle operation; said unit including means defining a furnace chamber and an adjoining convection gas pass, a fluid circulating system for generating and heating steam within said unit, fuel burning means for generating heating gas flow through said unit, an air heater and economizer connected in parallel to said gas pass, said air heater and economizer being connected in communication to said gas pass, and means for completely isolating said air heater from the gags pass during the combined gas-steam cycle operation and means isolating said economizer from said gas pass during steam cycle operation of said plant.

2. A power plant comprising a steam generating and heating unit, a gas turbine supplying its exhaust gases to said heating unit to recover the sensible heat from said exhaust gases, a steam turbine arranged to receive the steam output of said unit, and said steam generating and heating unit being connected to said turbines for either steam cycle operation or for combined gas-steam cycle operation, said steam generating and heating unit including a setting defining a furnace chamber and an adjoining convection gas pass having a gas outlet, burner means for producing gases of combustion in said furnace, a fluid circulating system of vapor generating and heating surfaces disposed within said setting in heat exchange relationship with the combustion gases flowing through the setting to said gas outlet, an air heater, an economizer, said air heater and economizer being connected in parallel and each having a gas inlet end in communication with the gas outlet, means for selectively and alternatively disposing said air heater and economizer into operative and inoperative heat exchange relationship to the combustion gases flowing from said setting, said economizer only being disposed in operative heat exchange relationship with the combustion gases during combined cycle operation, and conduit means connecting the exhaust end of said gas turbine to the inlet end of said economizer and to the burner means so that during combined cycle operation a portion of the exhaust gases is supplied to the burner means to support combustion while another portion of said exhaust gases is mixed with the combustion gases prior to entering said economizer when said economizer is rendered operative.

3. A power plant comprising a steam generating and heating unit, a gas turbine supplying its exhaust gases to said heating unit to recover the sensible heat from said exhaust gases, a steam turbine arranged to receive the steam output of said unit and said steam generating and heating unit being connected to said turbines for either straight steam cycle operation or for combined gas-steam cycle operation, said steam generating and heating unit including a setting having a furnace chamber and an adjoining convection gas pass having a gas outlet, burner means for producing gases of combustion in said furnace, a fluid circulating system of vapor generating and heating surfaces disposed within said setting in heat exchange relationship with the combustion gases flowing through the setting to said gas outlet, an air heater, an economizer, said air heater and economizer being connected in parallel and each having an inlet end in communication with the gas outlet, means for selectively and alternatively disposing said air heater and economizer into operative and inoperative heat exchange relationship to the combustion gases flowing from said setting, said air heater being disposed in operative heat exchange relationship to the combustion gas for straight steam cycle operation only and said economizer being disposed in operative heat exchange relationship with the combustion gases for combined cycle operation only, and conduit means for connecting the exhaust end of said gas turbine to said furnace chamber and to the gas inlet end of said economizer whereby a portion of the turbine exhaust gases is directed into the furnace chamber for minimizing radiant absorption in said furnace and for increasing the mass gas flow through said setting during combined cycle operation and another portion of said exhaust gas is mixed with the combustion gases prior to entering the economizer when the latter is rendered operative as a heat interchange device.

4. A power plant comprising a steam generating and heating unit, a gas turbine supplying its exhaust gases to said heating unit to recover the sensible heat from said exhaust gases, a steam turbine arranged to receive the steam output of said unit, and said steam generating and heating unit being connected to said turbines for either steam cycle operation or for combined gas-steam cycle operation, said steam generating and heating unit including a setting defining a furnace chamber and an adjoining convection gas pass having a gas outlet, burner means for producing gases of combustion in said furnace, a fluid circulating system of vapor generating and heating surfaces disposed within said setting in heat exchange relationship with the combustion gases flowing through the setting to said gas outlet, an air heater, an economizer, said air heater and economizer being connected in parallel and each having an inlet end in communication with the gas outlet, means for selectively and alternatively disposing said air heater and economizer into operative and inoperative heat exchange relationship to the combustion gases flowing from said settings, said air heater being disposed in operative heat exchange relationship to the combustion gases for steam cycle operation only and said economizer being disposed in operative heat exchange relationship to combustion gases for combined cycle operation only, and conduit means connecting the exhaust end of said gas turbine to the inlet end of said economizer, to the burner means, and to the furnace chamber so that during combined cycle operation a portion of the exhaust gases is mixed with the combustion gases prior to entering said economizer, another portion of said exhaust gases is supplied to the burners to support combustion, and still another portion is supplied to the furnace for minimizing radiant absorption in the furnace and to increase gas mass flow through the setting.

5. The invention as defined in claim 4 including a pulverizer for supplying pulverized fuel to said burner means, and a conduit connecting said turbine exhaust to said pulverizer for supplying thereto heated exhaust gases to mix with said fuel.

6. A binary power plant comprising a steam generating and heating unit, a gas turbine supplying its exhaust gases to said heating unit to recover the sensible heat from said exhaust gases, a steam turbine arranged to receive the steam output of said unit, and said steam generating and heating unit being connected to each of said turbines for either straight steam cycle operation or combined gas-steam cycle operation, said unit including means defining a furnace chamber and an adjoining gas pass, a fluid circulating system for generating and heating steam within said unit, fuel burning means for producing the flow of heating gases through said unit, an air heater, and an economizer, said air heater and economizer being connected in parallel and in communication with said gas pass, means for isolating said air heater from the gas pass during combined gas-steam cycle operation, means for isolating said economizer from said gas pass during steam cycle operation of said plant, a high pressure inter-stage heating means associated with said steam turbine, said inter-stage heating means being disposed between said steam turbine and economizer in series therewith, means conducting steam condensate from said steam turbine through said inter-stage heating means to heat the same for use as feedwater in said unit when said economizer is rendered inoperative as a heat interchange device during straight steam cycle operation, and means for by-passing said condensate around said inter-stage heating means when said economizer is rendered operative as a heat interchange device during combined gas-steam cycle operation.

7. In a binary fluid power plant adapted for either straight steam cycle operation or combined steam-gas cycle operation, a fuel fired high pressure steam generator including a furnace having fuel burning means for generating a heating gas flow through said generator, steam generating tubes arranged to receive heat from said furnace, a gas pass receiving high temperature gas from said furnace, a steam superheater connected in fluid circulation with said steam generating tubes, said superheater being disposed in said gas pass in heat transfer relationship to the heating gases flowing therethrough, an air heater and economizer connected in parallel to said gas pass and in communication therewith for receiving the heating gases flowing therefrom, means for selectively directing the heating gases flowing from said gas pass to either said air heater or said economizer, said selecting means rendering said air heater operative only during straight steam cycle operation and said economizer operative as a heat interchange device only during combined gas-steam cycle operation, a steam turbine arranged to receive superheated steam from said superheater, a steam condenser receiving exhaust steam from said steam turbine, an inter-stage low pressure heater associated in series with said steam condenser, pump and conduit means passing condensate from said steam condenser through said low pressure inter-stage heater for preheating said condensate for use as feedwater for said generator, a high pressure inter-stage heater associated with said steam turbine, said high pressure inter-stage heater being disposed in series and connected in fluid circulation with said low pressure inter-stage heater and said economizer, means for by-passing the flow of fluid from said low pressure inter-stage heater around said high pressure inter-stage heater, means for rendering said by-pass operative during the combined gas-steam cycle operation only, a gas turbine, means connecting the exhaust end of said gas turbine to said furnace and to the gas inlet of said economizer for directing a portion of the exhaust gases from said turbine to said furnace to support combustion and a portion of the exhaust gases to said economizer to combine with the heating gases flowing therethrough during combined gas-steam cycle operation only.

8. In a combined gas turbine-steam turbine electrical generating plant including a steam generating and heating unit for supplying steam to said steam turbine and which includes walls forming a furnace and a connected convection gas pass, fuel burning means for supplying freshly generated heating gases to the furnace, steam generating tubes lining the walls of the furnace, steam heating tubes disposed in said convection gas pass and connected for flow of fluid from said steam generating tubes and to said steam turbine, and an economizer downstream gas-wise of said steam heating tubes and supplying feedwater to said steam generating tubes, the method for improving the thermal efficiency of said unit during low load operation thereof comprising the steps of operating the gas turbine at substantially full load for generating the base electrical output of said plant, and varying the load of said steam generating unit to compensate for any swing in the electrical output of said plant above said base output during the combined gas-steam cycle operation thereof, recovering the hot exhaust gases from the gas turbine to increase the cycle efficiency of the steam generating unit during such load swings by dividing the recovered exhaust gases, combining at the inlet end of the economizer a divided portion of the exhaust gases together with the freshly generated heating gases of the unit and directing said combined gases over all the economizer heating surface to heat the feedwater by recovering the heat from said combined gases by indirect heat exchange, delivering another divided portion of said exhaust gases directly to the fuel burning means for utilization as a preheated combustion supporting medium, introducing still another divided portion of the exhaust gases directly into the furnace to reduce the amount of radiant heat transmission of the products of combustion to the steam generating tubes lining the walls of the furnace and to increase the gas mass flow through the unit, increasing the rate of flow of gas turbine exhaust to said furnace as the load of the steam generating unit decreases, and decreasing the rate of supply of freshly generated heating gases to the furnace as the load of the steam generating unit decreases.

9. A method of operating a binary elastic fluid power plant comprising a gas turbine, a steam generating and superheating unit having walls including steam generating tubes forming a furnace supplied with fuel and air and from which the products of combustion flow to a convection gas pass containing a superheater connected for flow of fluid from said steam generating tubes and an economizer downstream gas-wise of the superheater connected for flow of fluid to said steam generating tubes, and a steam turbine connected for flow of steam from said superheater, said method comprising the steps of passing the superheated steam from the superheater to the steam turbine, maintaining a predetermined steam temperature to the steam turbine over a wide range of steam turbine output, while maintaining a substantially uniform gas turbine output by supplying heating gases to said gas turbine at a substantially constant rate as the rate of steam turbine power output decreases, passing a portion of the exhaust gases of the gas turbine into said furnace for mixing with the freshly generated heating gases so as to vary the amount of radiant heat absorption by said steam generating tubes, passing the gases thus mixed through the furnace and over the superheater heating surface to the gas inlet end of the economizer, passing another portion of said gas turbine exhaust gases directly to the gas inlet end of the economizer for combining with the heating gases from the furnace, directing the gases so combined over all of the heating surface of the economizer, increasing the rate of flow of gas turbine exhaust gases to said furnace as the rate of steam turbine power output decreases, and decreasing the rate of supply of freshly generated gases to said furnace as the rate of steam turbine power output decreases.

References Cited in the file of this patent

UNITED STATES PATENTS

| | | |
|---|---|---|
| 2,055,385 | Noack | Sept. 22, 1936 |
| 2,428,136 | Barr | Sept. 30, 1947 |
| 2,471,755 | Karrer | May 31, 1949 |
| 2,653,447 | Heller | Sept. 29, 1953 |
| 2,717,491 | Barr | Sept. 13, 1955 |

FOREIGN PATENTS

| | | |
|---|---|---|
| 621,954 | Great Britain | Apr. 25, 1949 |